US009064050B2

(12) United States Patent
Duroiu et al.

(10) Patent No.: US 9,064,050 B2
(45) Date of Patent: Jun. 23, 2015

(54) ARBITRATING BUS TRANSACTIONS ON A COMMUNICATIONS BUS BASED ON BUS DEVICE HEALTH INFORMATION AND RELATED POWER MANAGEMENT

(75) Inventors: Cristian Duroiu, San Diego, CA (US); Jaya Prakash Subramaniam Ganasan, Youngsville, NC (US); Vinod Chamarty, San Diego, CA (US); Mark Michael Schaffer, Raleigh, NC (US); Joshua H. Stubbs, Boulder, CO (US); Robert N. Gibson, Boulder, CO (US); Kris Tiri, San Diego, CA (US); Moinul H. Khan, San Diego, CA (US); Bohuslav Rychlik, San Diego, CA (US); Serag GadelRab, Ontario (CA); Simon Booth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 13/253,381

(22) Filed: Oct. 5, 2011

(65) Prior Publication Data

US 2012/0102249 A1    Apr. 26, 2012

Related U.S. Application Data

(60) Provisional application No. 61/405,111, filed on Oct. 20, 2010, provisional application No. 61/405,233, filed on Oct. 21, 2010.

(51) Int. Cl.
*G06F 12/00* (2006.01)
*G06F 13/362* (2006.01)

(52) U.S. Cl.
CPC .......... *G06F 13/362* (2013.01); *Y02B 60/1228* (2013.01)

(58) Field of Classification Search
USPC .................. 710/116, 240–244, 200
See application file for complete search history.

(56) References Cited

U.S. PATENT DOCUMENTS 5,758,106 A    5/1998   Fenwick et al.
5,802,330 A    9/1998   Dutton
(Continued)

FOREIGN PATENT DOCUMENTS

CN    1051802 A    5/1991
CN    1896981 A    1/2007
(Continued)

OTHER PUBLICATIONS

International Search Report and Written Opinion—PCT/US2011/057142—ISA/EPO—Mar. 16, 2012.

*Primary Examiner* — Faisal M Zaman
*Assistant Examiner* — Kim T. Huynh
(74) *Attorney, Agent, or Firm* — Peter Michael Kamarchik; Nicholas J. Pauley; Joseph Agusta

(57) ABSTRACT

Devices, systems, methods, and computer-readable mediums for arbitrating bus transactions on a communications bus based on health information are disclosed. Health information of master devices can be used to adjust priorities of bus transactions from master devices to meet quality of service requirements of the master devices. In one embodiment, a bus interconnect is provided and configured to communicate bus transactions from any of a plurality of master devices to slave device(s) coupled the bus interconnect. The bus interconnect is further configured to map health information for each of the plurality of master devices into virtual priority space. The bus interconnect is further configured to translate the virtual priority space into a physical priority level for each of the plurality of master devices. The bus interconnect is further configured to arbitrate bus transactions for the plurality of master devices based on physical priority level for the plurality of master devices.

23 Claims, 12 Drawing Sheets

(56) References Cited

U.S. PATENT DOCUMENTS

| | | | |
|---|---|---|---|
| 5,805,840 A | 9/1998 | Dutton | |
| 5,845,096 A | 12/1998 | Munguia et al. | |
| 6,088,751 A | 7/2000 | Jaramillo | |
| 7,174,403 B2 | 2/2007 | Ganasan | |
| 7,299,311 B1* | 11/2007 | Sepeda et al. | 710/116 |
| 7,395,361 B2 | 7/2008 | Schaffer et al. | |
| 7,577,780 B2* | 8/2009 | Huang et al. | 710/116 |
| 7,802,040 B2 | 9/2010 | Aldworth et al. | |
| 2001/0009531 A1* | 7/2001 | Farmwald et al. | 365/233 |
| 2004/0223454 A1 | 11/2004 | Schober et al. | |
| 2005/0125581 A1 | 6/2005 | Brown et al. | |
| 2007/0198879 A1* | 8/2007 | Yim et al. | 714/712 |
| 2008/0020903 A1 | 1/2008 | Dieter | |
| 2008/0209093 A1 | 8/2008 | Huang et al. | |
| 2009/0287869 A1 | 11/2009 | Lim | |

FOREIGN PATENT DOCUMENTS

| | | |
|---|---|---|
| CN | 101676890 A | 3/2010 |
| JP | S62264349 A | 11/1987 |
| JP | S63128460 A | 6/1988 |
| JP | S6476256 A | 3/1989 |
| JP | H05298244 A | 11/1993 |
| JP | H0652097 A | 2/1994 |
| JP | H06124271 A | 5/1994 |
| JP | H11238033 A | 8/1999 |
| JP | H11306131 A | 11/1999 |
| JP | 2005033769 A | 2/2005 |
| JP | 2010176348 A | 8/2010 |
| WO | 2006091843 A1 | 8/2006 |
| WO | 2007024677 A2 | 3/2007 |

* cited by examiner

| Class | Max Priority | Typical BW |
|---|---|---|
| Hard Real Time | 3 | Mid/High |
| Low Latency | 2 | Low/Mid |
| Soft Real Time | 1/2 | Mid/High |
| Best Effort | 0 | Low/Mid/High |

ARBITRATING BUS TRANSACTIONS ON A COMMUNICATIONS BUS BASED ON BUS DEVICE HEALTH INFORMATION AND RELATED POWER MANAGEMENT

PRIORITY CLAIMS

The present application claim priority to U.S. Provisional Patent Application Ser. No. 61/405,111 filed on Oct. 20, 2010 and entitled "ARBITRATING BUS TRANSACTIONS ON A COMMUNICATIONS BUS BASED ON BUS DEVICE HEALTH INFORMATION AND RELATED POWER MANAGEMENT," which is incorporated herein by reference in its entirety.

The present application also claims priority to U.S. Provisional Patent Application Ser. No. 61/405,233 filed on Oct. 21, 2010 and entitled "ARBITRATING BUS TRANSACTIONS ON A COMMUNICATIONS BUS BASED ON BUS DEVICE HEALTH INFORMATION AND RELATED POWER MANAGEMENT," which is incorporated herein by reference in its entirety.

EXHIBIT

Exhibit A comprising eighteen (18) pages attached as an exhibit hereto provides non-limiting examples and is incorporated herein by reference in this disclosure in its entirety and forms part of this disclosure.

BACKGROUND

I. Field of the Disclosure

The technology of the disclosure relates generally to arbitration of bus transactions on a communications bus in a processor-based system and power management of a communications bus.

II. Background

Modern digital systems and processor-based designs typically employ a communications bus. The communications bus is configured to facilitate devices or peripherals, acting as master devices, sending communications to receiving peripherals or devices, acting as slave devices. For example, if a master device desires to send a read request to a slave device, the master device provides control information that includes an address and read command on the communications bus. The communications bus directs the command to the appropriate slave device coupled to the communications bus according to the control information. Further, master and slave devices coupled to the communications bus may be provided along with a communications bus on a single chip to provide a system-on-a-chip (SOC). SOCs are particularly useful in portable electronic devices because of their integration of multiple subsystems that can provide multiple features and applications in a single chip.

An arbiter can be provided for the communications bus to direct or arbitrate bus transactions from master devices to slave devices coupled to the communications bus. Bus arbitration may, for example, prevent bus transaction collisions. For example, a system that includes a computer processing unit (CPU), a digital signal processor (DSP), and direct memory access (DMA) controller coupled to a communications bus may all have access to a shared memory system also coupled to the communications bus. The arbiter arbitrates memory access requests from these devices to the shared memory system so that bus resources are allocated between competing requests from master devices. However, it is desired that the arbiter be configured not to expend routing resources processing requests from one master device on the communications bus that will cause an unacceptable increase in latencies of other requests by other master devices.

SUMMARY OF THE DISCLOSURE

Embodiments disclosed in the detailed description include devices, systems, methods, and computer-readable mediums for arbitrating bus transactions on a communications bus based on bus device health information and providing power management for the communications bus. In this manner, health information of the master devices is used by the bus interconnect to adjust the priorities of the bus transactions from the master devices to attempt to meet the quality of service requirements of the master devices. Meeting quality of service requirements can improve system robustness, increase performance by reduced latencies, and/or lower power consumption when health information indicates that quality of service requirements for the master devices are exceeded, as examples.

Further, by arbitrating bus transactions based on health information for master devices, priorities can be dynamically assigned to bus transactions to provide a dynamic bus arbitration scheme. Further, health information for the master devices can be first mapped into virtual priority space based on their class type before being translated into a physical priority to be used to arbitrate the bus transactions for the master devices. In this manner, constraints can be provided on the maximum priorities available to master devices based on their configured class type to avoid all master devices "racing-to-the top" of the priority scale. This also allows the arbiter to allocate the capacity of the bus interconnect for bus transactions among different master devices based on the relative criticalities of the master devices.

In this regard in one embodiment, the communications bus is a bus interconnect configured to communicate bus transactions from any of a plurality of master devices to a slave device(s) coupled the bus interconnect. The bus interconnect is configured to determine health information for the plurality of master devices. The bus interconnect is further configured to map the health information for each of the plurality of master devices into a virtual priority space. The bus interconnect is further configured to translate the virtual priority space into a physical priority level for each of the plurality of master devices. The bus interconnect is further configured to arbitrate bus transactions for the plurality of master devices based on the physical priority level for the plurality of master devices.

In another embodiment, a bus interconnect is provided. The bus interconnect comprises a means for determining health information for a plurality of master devices. The bus interconnect also comprises a means for mapping the health information for each of the plurality of master devices into a virtual priority space. The bus interconnect also comprises a means for translating the virtual priority space into a physical priority level for each of the plurality of master devices. The bus interconnect also comprises a means for arbitrating bus transactions for the plurality of master devices based on the physical priority level for the plurality of master devices.

In another embodiment, a method of arbitrating bus transactions in a bus interconnect is provided. The method includes determining health information for a plurality of master devices. The method also includes mapping the health information for each of the plurality of master devices into a virtual priority space. The method also includes translating the virtual priority space into a physical priority level for each of the plurality of master devices. The method also includes arbitrating bus transactions for the plurality of master devices based on the physical priority level for the plurality of master devices.

In another embodiment a computer-readable medium having stored thereon computer-executable instructions is provided. The computer-executable instructions are provided to cause a bus interconnect to determine health information for a plurality of master devices, map the health information for each of the plurality of master devices into a virtual priority space, translate the virtual priority space into a physical priority level for each of the plurality of master devices, and arbitrate bus transactions for the plurality of master devices based on the physical priority level for the plurality of master devices.

In another embodiment, a book keeping element is provided. The book keeping element is configured to determine a service contract for a master device. The book keeping element is also configured to compare the service contract to a service threshold. The book keeping element is also configured to encode health information regarding the master device based on the comparison of the service characteristic to the service contract. As non-limiting examples, the service contract may include a fixed bandwidth contract, an average latency contract, a variable bandwidth contract, or a dynamic contract.

BRIEF DESCRIPTION OF THE FIGURES

FIG. 2 is a block diagram of exemplary master device classes that can be employed to assign relative priorities between master devices in the bus interconnect in FIG. 1;

DETAILED DESCRIPTION

Figure 1:
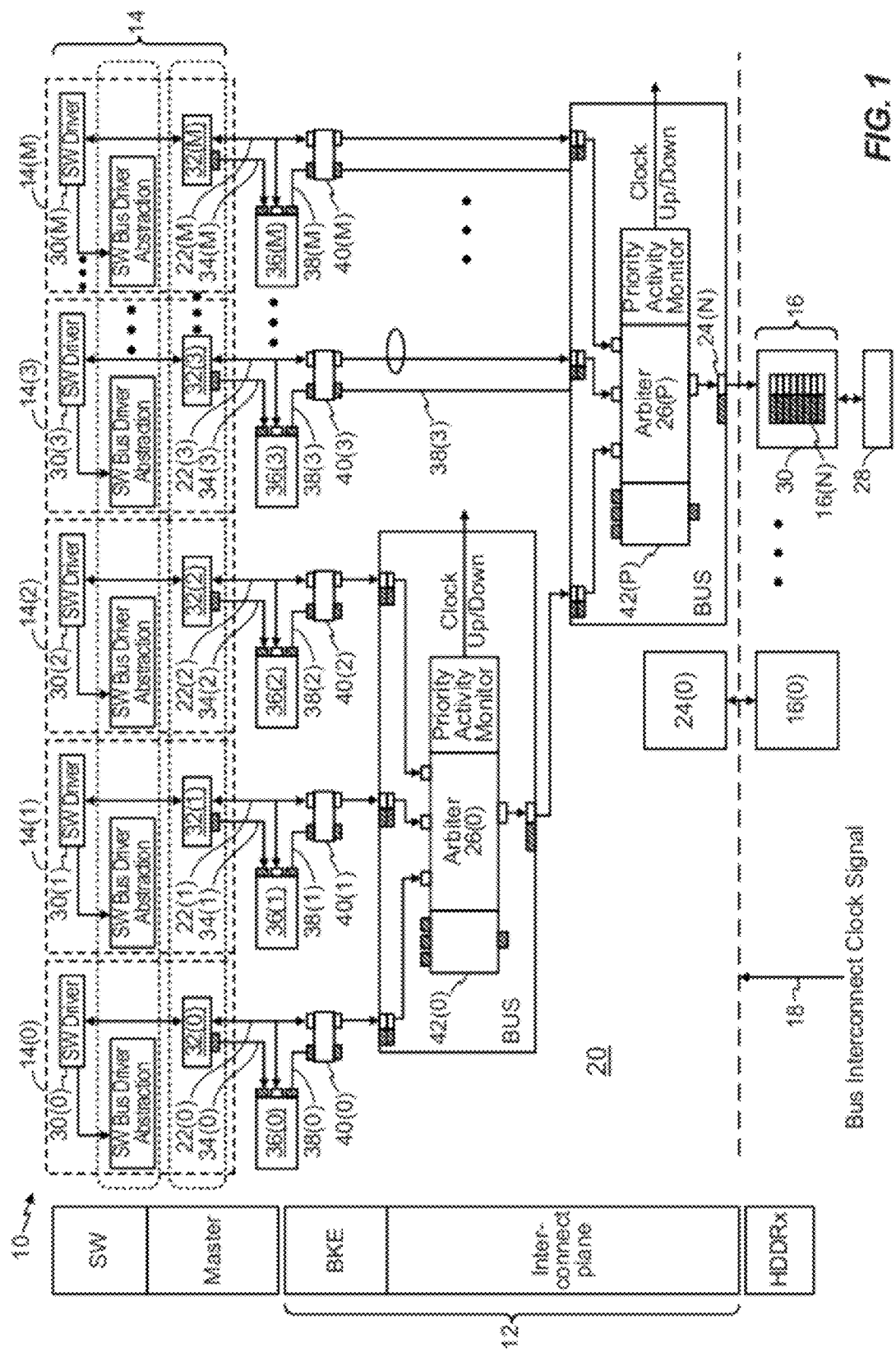
FIG. 1 is a block diagram of an exemplary bus interconnect system that includes a bus interconnect and an arbiter configured to arbitrate and route bus transactions between any of a plurality of master devices coupled to the bus interconnect and a slave device(s) coupled to the bus interconnect based on health information regarding the master devices.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include devices, systems, methods, and computer-readable mediums for arbitrating bus transactions on a communications bus based on bus device health information and providing power management for the communications bus. In this manner as an example, health information of the master devices is used by the bus interconnect to adjust the priorities of the bus transactions from the master devices to attempt to meet the quality of service requirements of the master devices. Meeting quality of service requirements can improve system robustness, increase performance by reduced latencies, and/or lower power consumption when health information indicates that quality of service requirements for the master devices are exceeded, as examples.

Further for example, by arbitrating bus transactions based on health information for master devices, priorities can be dynamically assigned to bus transactions to provide a dynamic bus arbitration scheme. Further, health information for the master devices can be first mapped into virtual priority space based on their class type before being translated into a physical priority to be used to arbitrate the bus transactions for the master devices. In this manner as an example, constraints can be provided on the maximum priorities available to master devices based on their configured class type to avoid all master devices "racing-to-the top" of the priority scale. This also allows the arbiter to allocate the capacity of the bus interconnect for bus transactions among different master devices based on the relative criticalities of the master devices.

In this regard, FIG. 1 is a block diagram of an exemplary bus interconnect system 10 that includes a bus interconnect 12 configured to arbitrate and route bus transactions between any of a plurality of master devices 14(0-M) coupled to a communications bus, referred to as the "bus interconnect 12," and a slave device(s) 16(0-N) coupled to the bus interconnect 12. As examples, the bus interconnect 12 may be provided by a field programmable gate array (FPGA), an application-specific integrated circuit (ASIC), a controller, micro-controller or microprocessor that may execute software instructions, or any combinations thereof. The bus interconnect 12 includes clocked circuitry, such as gates, latches, and registers as examples, that is configurable to set up a communication path between the desired master device 14(0-M) and the desired slave device 16(0-N). The slave devices 16(0-N) may be shared resources to the master devices 14(0-M). A bus interconnect clock signal 18 is provided to clock the clocked circuitry provided in the bus interconnect 12.

The bus interconnect 12 is configurable to allow one or more of the master devices 14(0-M) connected to the bus interconnect 12 to communicate with any of the slave devices 16(0-N) coupled to the bus interconnect 12. As an example, the bus interconnect 12 may be provided in a semiconductor die 20 and may be provided in a system-on-a-chip (SOC) integrated circuit design, if desired. The master devices 14(0-M) and slave devices 16(0-N) are connected to the bus interconnect 12 via master ports 22(0-M) and slave ports 24(0-N), respectively, provided in the bus interconnect 12 in this example. One or more arbiters 26(0-P) are provided in the bus interconnect 12 that are configured to arbitrate multiple bus transaction requests from the master devices 14(0-M) to the slave devices 16(0-N).

The master devices 14(0-M) and the slave devices 16(0-N) can be any type of electronic device or subsystem desired. For example, the master devices 14(0-M) may be any type of electronic device, including without limitation a central processing unit (CPU), a digital signal processor (DSP), a display processor, and a direct memory access (DMA) controller. An example of the slave device 16(0-N) is a memory controller 16(N). The memory controller 16(N) is connected to the bus interconnect 12 to allow any of the master devices 14(0-M) to provide read and write memory access requests to memory 28 coupled to the memory controller 16(N) and to receive read and write responses.

The bus interconnect 12 in FIG. 1 is configured to arbitrate the bus transactions for each of the master devices 14(0-M) based on health information regarding the master devices 14(0-M). The health information for the master devices 14(0-M) is comprised of some indicia representing a quality of service that is provided by the bus interconnect 12 to the master devices 14(0-M). For example, the master devices 14(0-M) may each have certain quality of service requirements. One example of a quality of service requirement may be a bandwidth requirement. Another example of a quality of service may be a latency requirement. The health information for the master devices 14(0-M) is used by the bus interconnect 12 in this embodiment to adjust the priorities of the bus transactions from the master devices 14(0-M) to attempt to meet the quality of service requirements of the master devices 14(0-M), including but not limited to system robustness, improved performance by reduced latencies, and/or lowering power consumption when quality of service requirements are exceeded. Further, the methodologies and components provided in the bus interconnect 12 in this embodiment configured to arbitrate bus transactions can be provided independent of the actual bus technology of the bus interconnect 12 and the frequency of the bus interconnect clock signal 18 and scaling thereof With continuing reference to FIG. 1, the master devices 14(0-M) may each include certain master device software drivers 30(0-M) and master device hardware 32(0-M) to provide certain functions that require services of the slave device 16(0-N) coupled to the bus interconnect 12. The master devices 14(0-M) request these services through bus transactions communicated to the slave devices 16(0-N) through the bus interconnect 12. These bus transactions require a particular level of performance, which is dependent on factors intrinsic to the core of the bus interconnect 12, such as the frequency of the bus interconnect clock signal 18 and throughput and latency of the bus interconnect 12 as examples. In this regard, the master devices 14(0-M), either through hardware or software mechanisms, may be configured to track their health statuses. For example, a health status may be based on whether deadlines for bus transactions for the master device 14(0-M), bandwidth allocated for the master device 14(0-M), and/or latency requirements for the master device 14(0-M) are being satisfied by the bus interconnect 12.

In this regard, the master device software drivers 30(0-M) and master device hardware 32(0-M) in FIG. 1 can be configured to track their own health statuses to in turn track the health statuses of the master devices 14(0-M). The tracked health status of the master devices 14(0-M) can be provided by the master devices 14(0-M) to the bus interconnect 12 as health information to be used for arbitrating bus transactions among the plurality of master devices 14(0-M) to improve performance of the bus interconnect 12 and the bus interconnect system 10. These improvements include but are not limited to improving robustness by providing sufficient capacity in terms of bandwidth, improving performance through reduced latencies, and/or lowering power consumption. The health information may also be used to support reordering of commands in the bus interconnect 12 and/or support priority-based queuing of commands, such as in the memory controller 16(N).

The master device 14(0-M) may provide its own health information 34(0-M) directly to the arbiters 26(0-P) or through an intermediary, such as a book keeping element (BKE) 36(0-M) in FIG. 1. For example, with reference to FIG. 1, the master devices 14(0-M) may be configured to provide the health information 34(0-M) containing their health statuses to the BKE 36(0-M). The book keeping elements 36(0-M) can determine if the performance requirements of the master devices 14(0-M) are being satisfied by the bus interconnect 12. The book keeping elements 36(0-M) provide information 38(0-M) through virtual bus interfaces 40(0-M) to the arbiters 26(0-P) that indicates whether performance requirements for the master devices 14(0-M) are being satisfied based on the health information 34(0-M). The book keeping elements 36(0-M) can be provided inside or outside the core of the bus interconnect 12. The arbiters 26(0-P) use this information to determine a priority for arbitrating bus transactions for the master devices 14(0-M) within the bus interconnect 12 based on whether the requirements for the master devices 14(0-M) are being satisfied. For example, the arbiters 26(0-P) each contain a priority determination module 42(0-P) to determine the priority for bus transactions for each of the master device 14(0-M). The health information 34(0-M) may be provided for each of the master device 14(0-M), such as a master identification (MID) of the master device 14(0-M), or in groups of the master devices 14(0-M). The requirements of the master devices 14(0-M) may be aggregated per master port 22(0-M).

As will be discussed in more detail below, for the master devices 14(0-M) that cannot or are not configured to track their own health status, the book keeping elements 36(0-M) can derive the health information 34(0-M) for the master devices 14(0-M) based on a contract configured by software. For example, programmable thresholds may be provided in the book keeping elements 36(0-M) to determine if the performance requirements of the master devices 14(0-M) are being met by the bus interconnect 12. The bandwidths provided by the bus interconnect 12 for the master devices 14(0-M) can be used to derive the health status for the master devices 14(0-M). The book keeping elements 36(0-M) provide this information 38(0-M) through the virtual bus interfaces 40(0-M) to the arbiters 26(0-P) as to whether the performance requirements are being met for the master devices 14(0-M) based on the derived health information 34(0-M). The arbiters 26(0-P) use this information to determine a priority for arbitrating bus transactions for the master devices 14(0-M) within the bus interconnect 12 based on whether the requirements for the master devices 14(0-M) are being satisfied.

The health information 34(0-M) may be encoded in various manners. For example, the health information 34(0-M) may be encoded in health status thresholds or ranges that represent the health information 34(0-M). For example, a health status between zero percent (0%) and thirty-three percent (33%) of bus transactions not meeting performance requirements may be indicative of a "well" health status. A health status between thirty-three percent (33%) to sixty-seven percent (67%) of bus transactions not meeting performance requirements may be indicative of a "fever" health status. A health status between sixty-six percent (66%) and ninety-nine percent (99%) of bus transactions not meeting performance requirements may be indicative of a "sick" health status. A health status at one hundred percent (100%) not meeting performance requirements may be indicative of a "failed" health status. In this example, this health information 34(0-M) may be encoded in 2-bits. This health information 34(0-M) can be specified to each master device 14(0-M). The thresholds may also be programmable for the master devices 14(0-M).

As will be discussed in more detail below, the book keeping elements 36(0-M) can be configured to use a reference clock that is independent of the bus interconnect clock signal 18 to provide an implementation that is frequency independent of the bus interconnect clock signal 18. A separate, constant frequency clock signal may be provided to clock the book keeping elements 36(0-M). In this manner, if the bus interconnect clock signal 18 is scaled for the bus interconnect 12, the book keeping elements 36(0-M) do not have to be reprogrammed or reconfigured to determine if the performance requirements of the master devices 14(0-M) are being satisfied based on a new clock frequency.

Each master port 22(0-M) has an associated static translation table in this embodiment describing how health information is to be converted into priority information. This table can be predefined for the given bus interconnect system 10 architecture, and configured by the master device software drivers 30(0-M). This table describes how master devices 14(0-M) are classified and how health information is mapped into priority levels to be arbitrated by the arbiters 26(0-P) in the bus interconnect 12. In this regard, FIG. 2 is a block diagram of exemplary master device class table 50 that contains master device classes that can be employed to assign relative priorities between master devices 14(0-M) in the bus interconnect 12 in FIG. 1. As an example, the master device class table 50 contains a maximum priority 52 and typical bandwidth requirements 54 for different classes 56 of master devices 14(0-M). For example, master devices 14(0-M) that are assigned as hard real time devices may have a higher maximum priority 52 for bus transactions arbitrated by the bus interconnect 12 than low latency, soft real time, and best effort type master devices 14(0-M). Examples of hard real time master devices 14(0-M) may include GPSs, MDPs, VFEs, and modems. An example of a master device 14(0-M) that requires low latencies is a CPU. Examples of soft real time master devices 14(0-M) may include video devices, rotator devices, and VPEs. Examples of best effort master devices 14(0-M) may include graphics devices and peripherals.

Figure 3:
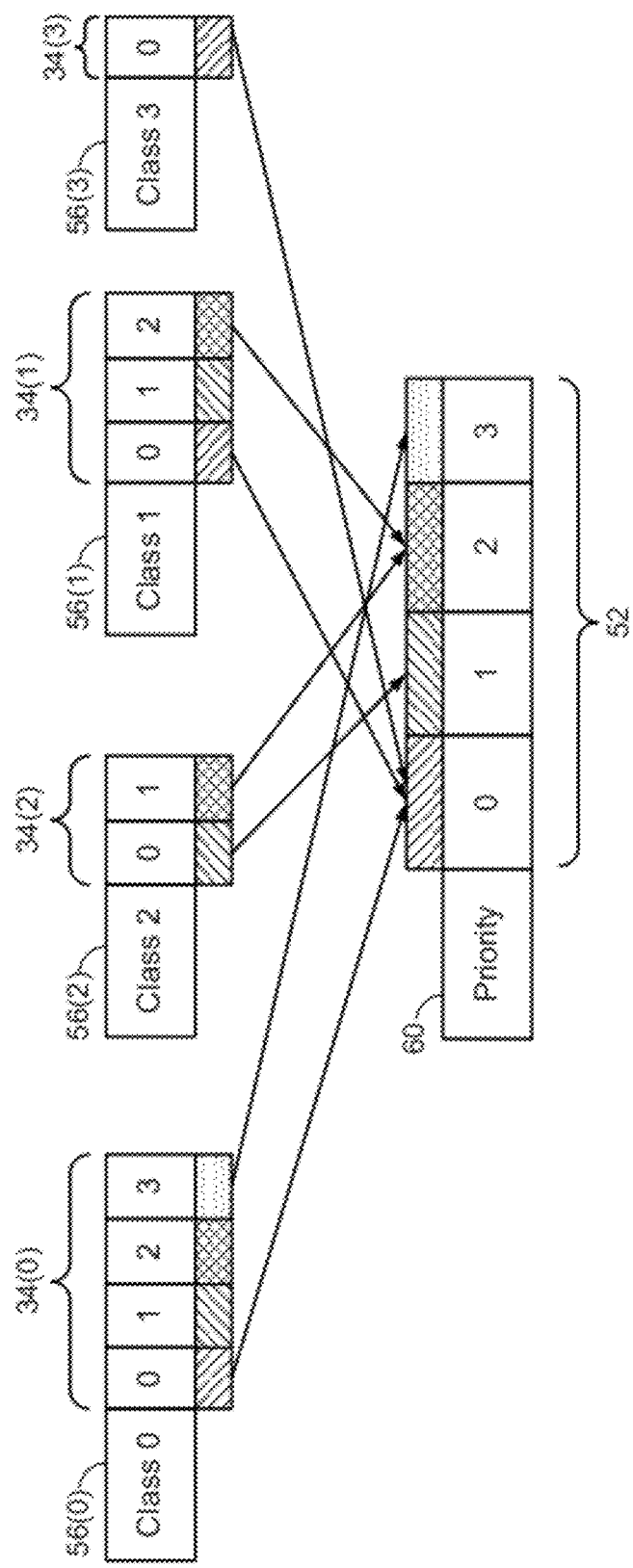
FIG. 3 is a block diagram of an exemplary mapping of health information to virtual priority space that can be in the bus interconnect system in FIG. 1.

The health information 34(0-M) regarding the master devices 14(0-M) is mapped into a virtual priority space in the bus interconnect 12. In this regard, FIG. 3 is a block diagram of exemplary health information mapping to the virtual priority space that can be provided in the bus interconnect system 10 in FIG. 1. It can be seen that bus transactions for master devices 14(0-M) configured as devices 56(0) (i.e., hard real time) can be mapped to a virtual priority table 60 containing the possible maximum priorities 52 (e.g., 0-3) based on the health information 34(0). Bus transactions for master devices 14(0-M) configured as devices 56(1) (i.e., low latency) can be mapped to the virtual priority table 60 containing the possible maximum priorities 52 (e.g., 0-3) based on the health information 34(1). Bus transactions for master devices 14(0-M) configured as devices 56(2) (i.e., soft real time) can be mapped to the virtual priority table 60 containing the possible maximum priorities 52 (e.g., 0-3) based on the health information 34(2). Bus transactions for master devices 14(0-M) configured as devices 56(3) (i.e., best effort) can be mapped to the virtual priority table 60 containing the possible maximum priorities 52 (e.g., 0-3) based on the health information 34(3). The arbiters 26(0-P) use the mapping information in the virtual priority table 60 to translate a physical priority for arbitrating bus transactions from the master devices 14(0-M) based on the health information 34(0-M) for the master devices 14(0-M).

Mapping of health information into virtual priority space allows the bus interconnect 12 to control prioritization assigned to bus transactions based on the class type and health information for the master devices 14(0-M). If this mapping is desired to be changed, the class types can be remapped to different virtual maximum priorities 52 in the virtual priority table 60 without having to reprogram or reconfigure the master devices 14(0-M). Mapping to virtual priority space also allows definition and control by the bus interconnect 12 of what the relative priority is between master devices 14(0-M) in the bus interconnect system 10. This is achieved by limiting the maximum priority 52, as provided in the master device class table 50 in FIG. 2, that can be used by a given class 56 of master devices 14(0-M). Thus, which master devices 14(0-M) are critical for survival of the bus interconnect system 10 becomes constrained. The role of this constraining is to prevent a "race-to-the-top" condition among the master devices 14(0-M) in which all master devices 14(0-M) are trying to climb to higher priorities to satisfy their performance contracts.

If the health information 34(0-M) for the master devices 14(0-M) does not indicate any performance or quality of service issues, all master devices 14(0-M) are arbitrated by the arbiters 26(0-P) in FIG. 1 using the lowest priority defined in the virtual priority table 60 in FIG. 3. Otherwise, the priority of the bus transactions for the master devices 14(0-M) indicating health information issues is altered in the arbiters 26(0-P) based on the virtual priority table 60 in FIG. 3. Thus, the arbitration priority scheme is dynamic in that priorities are assigned to arbitration bus transactions for the master devices 14(0-M) based on the health information 34(0-M) derived or analyzed by the book keeping elements 36(0-M) in FIG. 1.

Different arbitration policies may be employed by the arbiters 26(0-P). For example, in a fair round-robin (FRR) arbitration priority scheme, an upper priority level bus transaction will take precedence and filter first the available bandwidth fairly between bus transactions between different master devices 14(0-M) at the same level of criticality. This in essence is a most critical deadline first arbitration priority scheme. If the bus interconnect 12 implements buffering, the priority information can be used to reorder the commands to provide priority queuing. Other arbitration priority policies may be employed. For example, a simple round-robin arbitration priority scheme may be employed where all master devices 14(0-M) will have the same priority assigned. A fixed arbitration priority scheme may be employed where all master devices 14(0-M) have a fixed priority assigned based on their class.

Figure 4A:
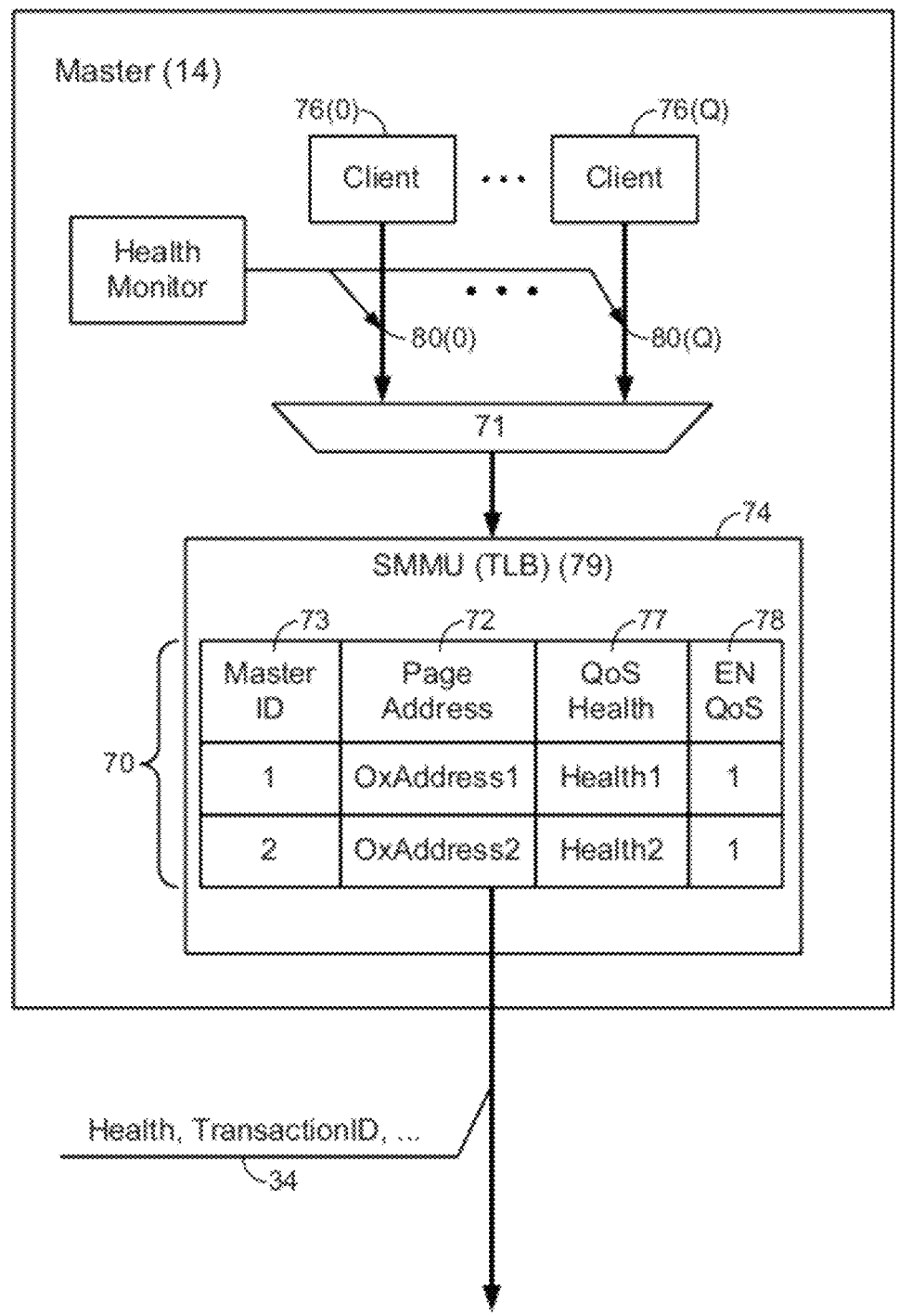
FIG. 4A is a block diagram of an exemplary master device configured to provide health information based on a health status of the master device to the bus interconnect in FIG. 1.

As discussed above, the master devices 14(0-M) can be configured to provide the health information 34(0-M) to the bus interconnect 12. There are cases where multiple clients of a master device 14 can individually set health information for transactions generated by clients to the master devices 14. In this regard, FIG. 4A is a block diagram of an exemplary master device 14 configured to provide health information 34 to the bus interconnect 12 in FIG. 1. The health information may be based on aggregated health information 80(0-Q) from multiple clients 76(0-Q) of the master device 14 and/or health information of the master device 14 aggregated by aggregator 71. There are instances where, for example, latency sensitive clients 76(0-Q), like CPUs, are aggregated inside subsystems, such as the master device 14 in FIG. 4A. It may be important to give priority to these types of clients 76(0-Q) to improve performance of the bus interconnect system 10. In this example, the health information 34 is comprised of a plurality of health information segments 70. As discussed in more detail below, the plurality of health information segments 70 are comprised of entries in an address map 74. The address map 74 contains entries indexed based on a master ID entry 73 identifying the master device 14 to which the health information 34 is applicable for assigning priority of master devices 14 based on health information.

For example with continuing reference to FIG. 4A, when a System Memory Management Unit (SMMU) 79 is used for a core or subsystem, a quality of service (QoS) health indication 77 can be associated with the memory pages 72, which are translation lookaside buffer (TLB) entries in this example. The SMMU 79 may be provided internally or externally to the master device 14. The QoS health indication 77 will contain the health information associated with accesses with particular address regions or pages in the page address space of the memory pages 72. The health information will be translated subsequently into virtual priority space as discussed above. For example, address regions or pages may be marked as having critical health, which in turn can be translated into high priority by health to priority exemplary translation mechanisms disclosed later below in more detail. This feature can be aggregated by aggregator 71 and used in conjunction with health information 80(0-Q) coming from the clients 76(0-Q). For example, a maximum between incoming health information 80(0-Q) and QoS health indications 77 may be used to derive the most critical health value. Alternatively, solely QoS health indication 77 information or incoming health information 80(0-Q) can be used. In addition, each QoS health indication 77 can include a QoS tag 78 indicating whether the QoS health indication 77 is valid and can be used or not. The TLB misses can be tagged as having critical health information, which can be translated into high priority, to allow the TLB misses to be propagated with faster response times in the bus interconnect system 10 to reduce the response time for the respective master device 14.

Figure 4B:
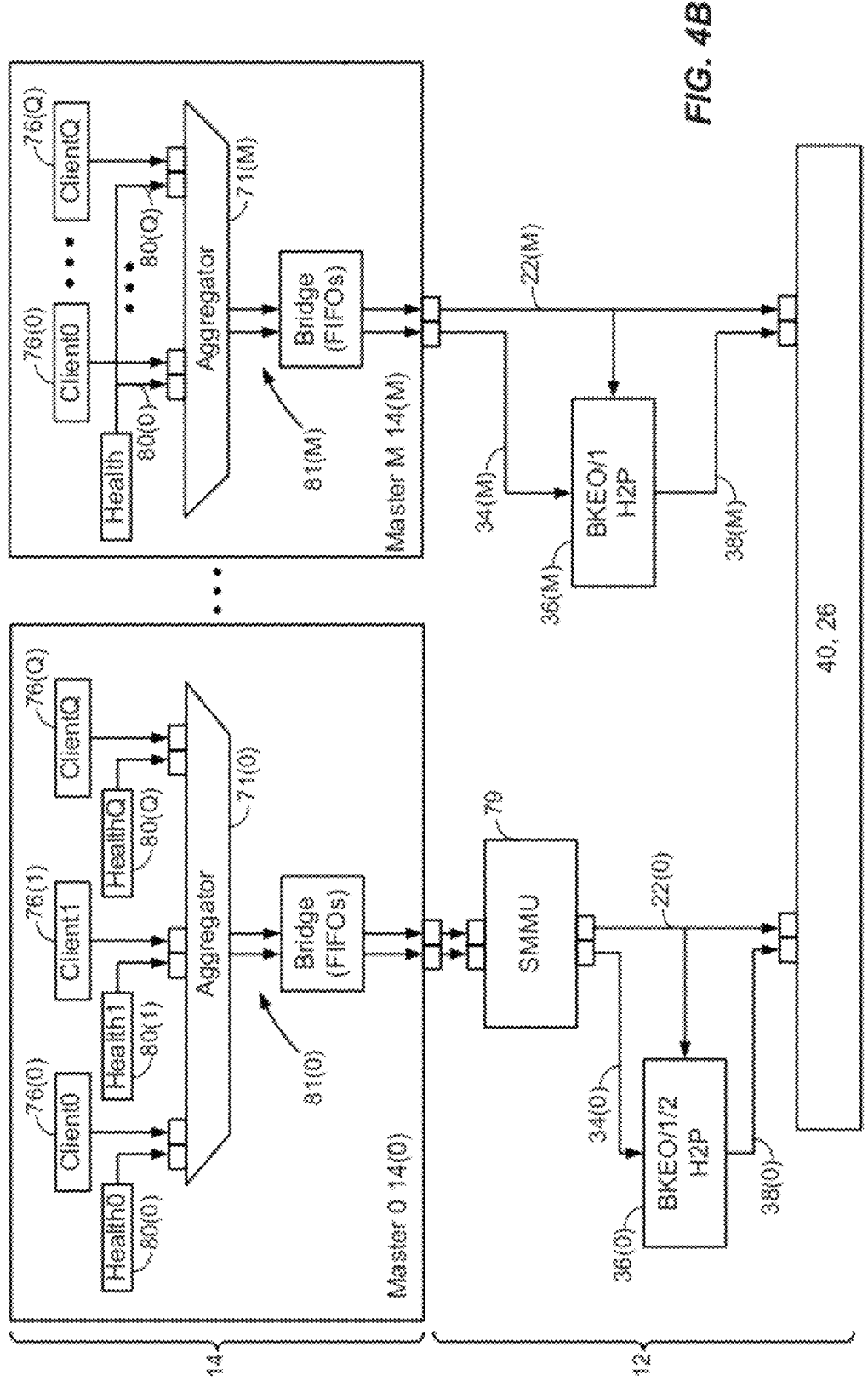
FIG. 4B is a block diagram of exemplary master devices configured to aggregate health information from multiple clients and provide the aggregated health information to the bus interconnect of FIG. 1.

FIG. 4B is a block diagram of multiple master devices 14(0-M) illustrated in FIG. 4A. The master devices 14(0-M) are each configured in this embodiment to aggregate health information 80(0-Q) from multiple clients 76(0-Q) and/or the master devices 14(0-M) and provide an output of aggregated health information 81(0-M) to the bus interconnect 12 of FIG. 1. In this example, the master device 14(0) and the SMMU 79 in FIG. 4B is the master device 14 and the SMMU 79 illustrated in FIG. 4A. Other master devices (e.g., master device 14(M)) may also include aggregators (e.g., aggregator 71(M)) to aggregate health information 80(0-Q) from multiple clients 76(0-Q) and/or a master device (e.g., master device 14(M)). As discussed below in more detail, the aggregate health information 81(0-M) is used to determine the priority level at which the arbiter 26 arbitrates bus transactions for the master devices 14(0-M).

As discussed above with regard to FIG. 1, the book keeping elements 36(0-M) monitor the master ports 22(0-M) and can derive the health status of the master devices 14(0-M) if the health information is not provided by the master devices 14(0-M) to the bus interconnect 12. For example, the book keeping elements 36(0-M) may include software or be a software programmable entity. In this regard, in the embodiment in FIG. 1, to make the book keeping elements 36(0-M)

frequency independent of the bus interconnect clock signal 18, a fixed or contact clock signal is used to clock the book keeping elements 36(0-M) (e.g., 20 Megahertz (MHz)). The book keeping elements 36(0-M) may work with a fixed bandwidth requirement or other type of contract to ensure that the average latency, including but not limited to round trip latency, of bus transactions for the master devices 14(0-M) is maintained over a given period or as expected. As an example, one type of contract that can be monitored by the book keeping elements 36(0-M) to determine the health status of the master devices 14(0-M) is a fixed bandwidth contract (FBC). An FBC can provide a guarantee of transferring a given amount of data within a given time window. Another example of a contract that may be used by the book keeping elements 36(0-M) to determine the health status of the master devices 14(0-M) is an average/instantaneous latency contract (ALC). An ALC can provide a guarantee of meeting an average round trip latency of a given time for a traffic profile with an average given bandwidth. Another example of a contract that may be used by the book keeping elements 36(0-M) to determine the health status of the master devices 14(0-M) is a variable bandwidth contract (VBC). A VBC starts with a bandwidth guarantee like the FBC. In addition, the master device 14(0-M) is allowed to dynamically update the contract through hardware signaling in pre-configured increment or decrement steps.

Figure 5:
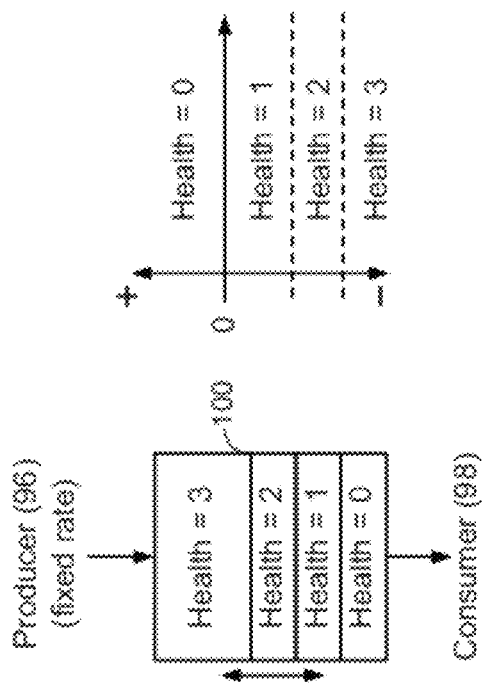
FIG. 5 is a diagram of an exemplary credit/debit option that can be employed in a book keeping element (BKE) in FIG. 1 for deriving the service level of a master port(s) in the bus interconnect of FIG. 1.
Figure 5:
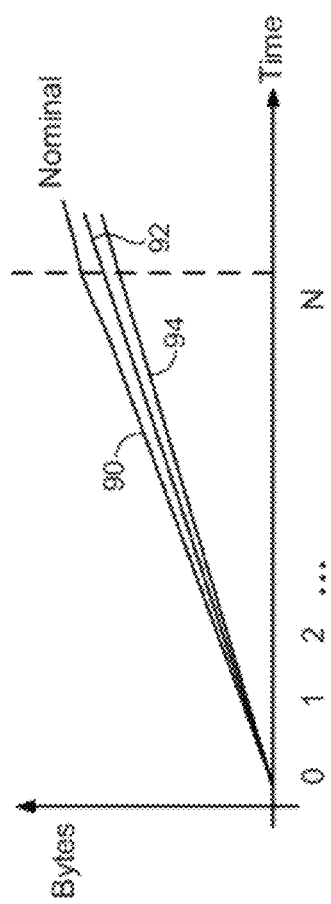

FIG. 5 is a diagram of an exemplary credit/debit option that can be employed in the book keeping elements 36(0-M) in FIG. 1 for deriving the service level provided by the bus interconnect 12 for the master devices 14(0-M) in FIG. 1. In this example, the given amount of data to be transferred in a given amount of time requirement is translated into an average target grant count (GC) (i.e., transactions granted or total bytes transferred) per grant period (GP). For example, the grant period may be expressed in cycles of the clock signal clocking the book keeping elements 36(0-M) (e.g., 20 MHz). The GC/GP establishes a trajectory that is monitored by the book keeping elements 36(0-M). Every period, the book keeping elements 36(0-M) will calculate accumulated $GC_i$ as $(IGC_i-GC)$+accumulated $GC_{i-1}$, with IGC being the instantaneous grant count. The health status is based on threshold levels provided by trajectories 90, 92, 94 that emulate a real time buffer behavior, and while the rate of a producer 96 is equal to the rate of a consumer 98, a buffer 100 is empty (or almost empty). When the rate of the consumer 98 drops, the buffer 100 is becoming filled up following the instantaneous drop in bandwidth. The health status is determined by assigning levels in the buffer 100. The book keeping elements 36(0-M) are configured to follow the nominal slope trajectory 90. If the rate drops, it will be below this slope, triggering health status updates. The thresholds and health statuses corresponding to each can be programmed. The GP can be provided in terms of grants or bytes of data per GP.

Figure 6A:
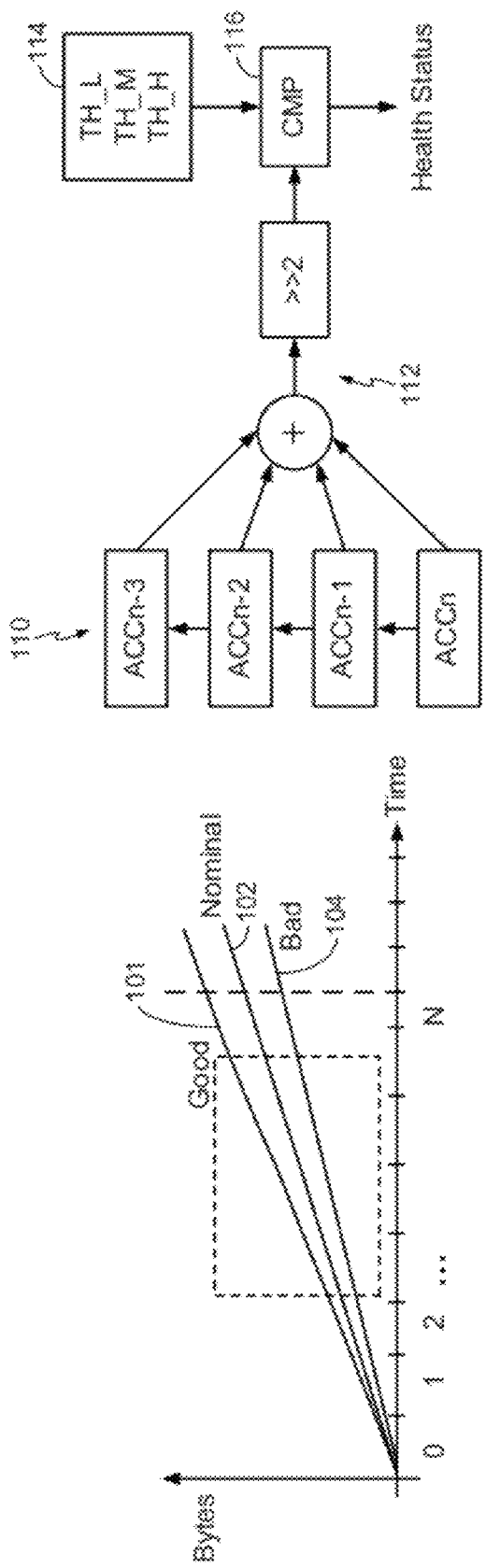
FIGS. 6A and 6B are diagrams of an exemplary averaging option that can be employed in the BKE in FIG. 1 for deriving the service level of the master port(s) in the bus interconnect of FIG. 1.
Figure 6B:
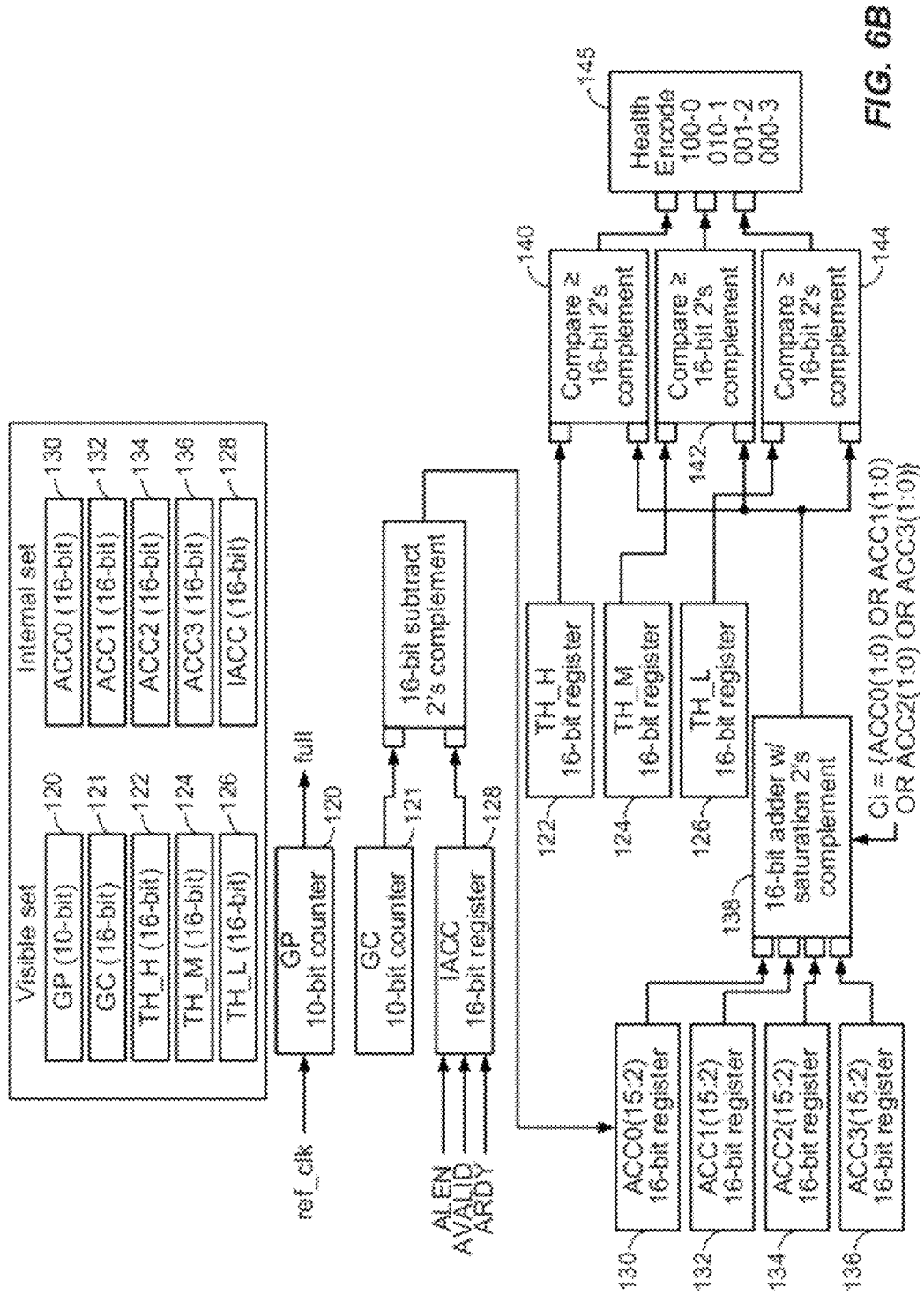

FIGS. 6A and 6B are diagrams of an exemplary averaging option that can be employed in the book keeping elements 36(0-M) in FIG. 1 for deriving the health status level of bus transactions from the master devices 14(0-M) in the bus interconnect 12 of FIG. 1. In FIG. 6A, the service requirement or contract will be translated into an average target GC (i.e., transactions granted or total bytes transferred) per GP. The GC/GP establishes a trajectory 101, 102, 104 that is monitored by the book keeping elements 36(0-M). Every period, the book keeping elements 36(0-M) will calculate Accumulated $GC_i=(IGC_i-GC)$, with IGC being the instantaneous grant count. GC can be expressed either as grants or as bytes. At the end of the GP interval, the accumulated value is shifted into a four (4) entry First-In, First-Out (FIFO) register 110, which implements a 4-Tap running average filter 112. The oldest value is shifted out. The values of the FIFO register 110 are summed and divided by 4. Thus, error due to "bad" contracts are not accumulated in absolute fashion, but are averaged. The result is compared against three thresholds 114 in a comparator 116 to determine the health status. The bandwidth thresholds 114 and health statuses are programmable through GP and GC.

In the example of FIG. 6B, 16-bit programmable counters 120, 121 are provided for GP and GC tracking. Three (3) 16-bit threshold registers 122, 124, 126 are provided that are used to derive health status. An instantaneous byte/grant accumulator (IACC) 128 holds the accumulated bytes for the current GP. Four (4) 16-bit accumulator registers ACC0/1/2/3 130, 132, 134, 136 are provided. In regard to combinational logic, a 4:1 adder 138 is provided to add the 16-bit accumulators registers 130-136. The adder 138 calculates ceiling (ACC0/4+ACC1/4+ACC2/4+ACC3/4). This can be done also using a 1× subtractor and a 1× adder. Three comparators 140, 142, 144 and an encoder 145 that compare the averaging result with the three threshold registers 122, 124, 126 for health derivation are also provided.

Figure 7:
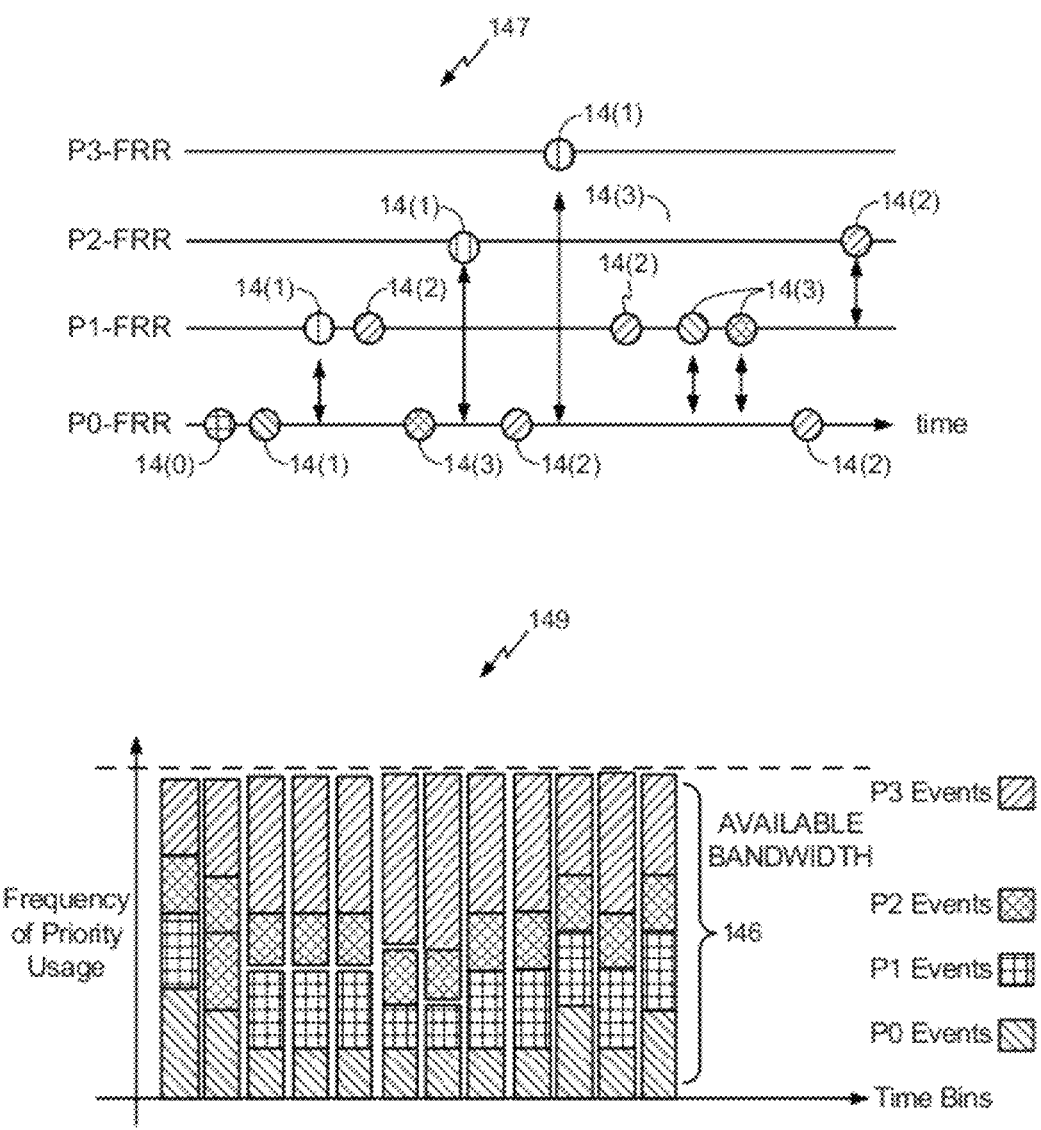
FIG. 7 is a is a conceptual diagram of priorities employed by the arbiters for arbitrating bus transactions for master devices based on the health information regarding the master devices.

FIG. 7 is a conceptual diagram of priorities employed by the arbiters 26(0-P) for arbitrating bus transactions for certain master devices 14(0-3) based on the health information regarding the master devices 14(0-M) and the mapping of the type of master devices 14(0-M) to virtual priority space according to the embodiments described above. As illustrated in a priority diagram 147 in FIG. 7, the priority level (P0-P3) at which the arbiter 26(0-P) arbitrates bus transactions for the master devices 14(0-3) can change based on when a change in health information regarding the master devices 14(0-3) occurs. For example, as illustrated in the priority diagram 147, bus transactions from the master device 14(1) are initially arbitrated by the arbiters 26(0-P) at a low priority. In response to decreasing health, the priority assigned to the master device 14(1) is elevated to a higher priority.

Arbitration can be performed by the arbiters 26(0-P) in fair round-robin (FRR) fashion for all priority levels P3-P0 starting with the highest priority level P3. This provides a bandwidth filtering mechanism in which the bus transactions with the highest priority will absorb first available bandwidth 146 from the bus interconnect 12 and the slave devices 16(0-N), as shown in the priority diagram 147 in FIG. 7. The remaining bandwidth can be allocated by the arbiters 26(0-P) to the lower priority master devices 14(0-M), as illustrated in a priority usage diagram 149 in FIG. 7. All the masters devices 14(0-M), for as long as requirements are met, will be arbitrated in the lowest priority (unless otherwise programmed by the translation tables for each master port 34(0-M). The arbiters 26(0-P) can include an arbiter activity monitor to collects statistics from the priority frequency usage to understand the effort made by the arbiter 26(0-P) to meet requirements. This scheme is intended to be used to provide a recommendation to capacity entity for capacity increase or decrease.

Figure 8:
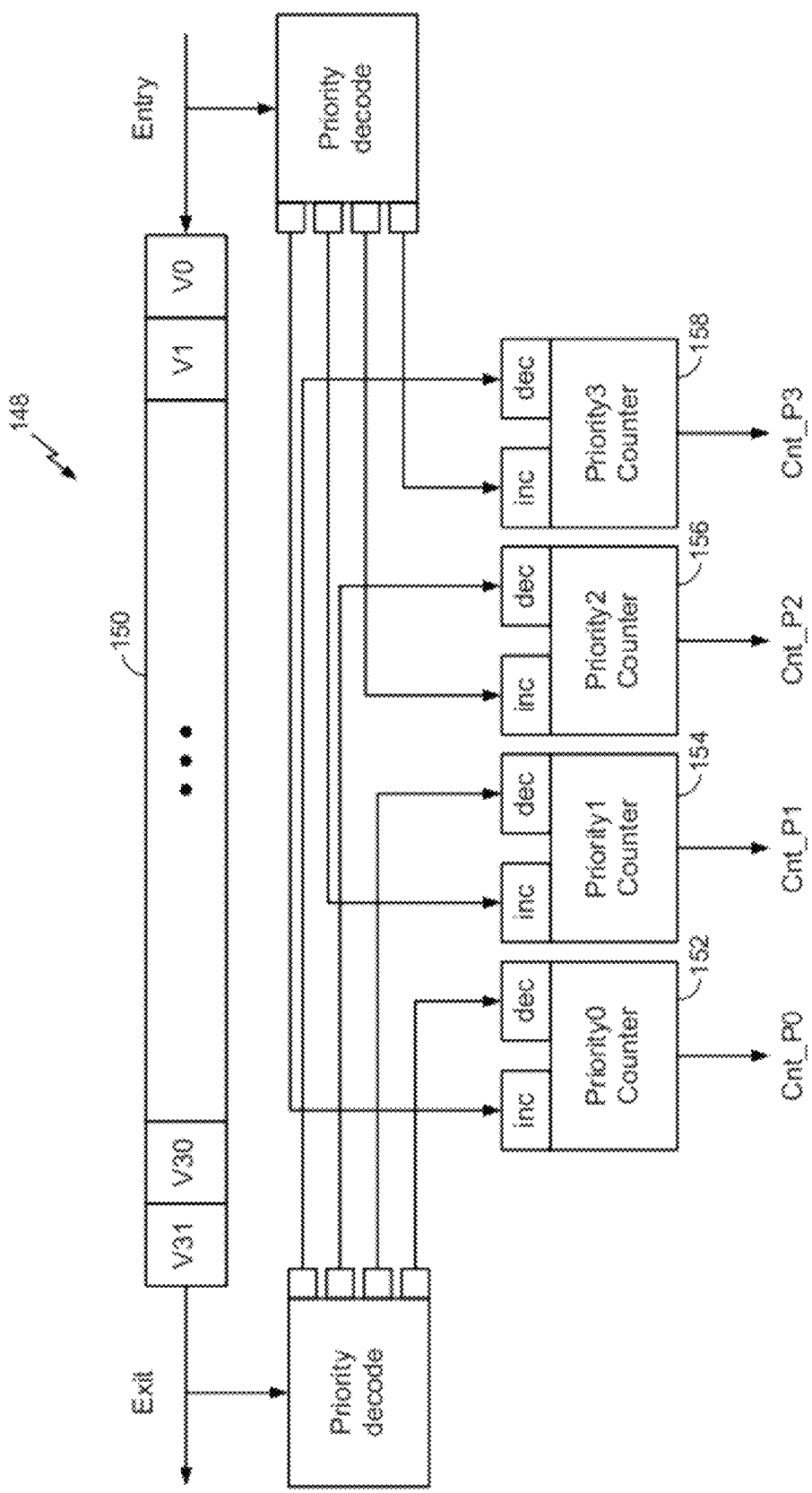
FIG. 8 is a block diagram of exemplary priority activity monitoring that can be provided in the bus interconnect of FIG. 1.

FIG. 8 is a block diagram of exemplary priority activity monitoring 148 that can be provided in the bus interconnect 12 of FIG. 1. By monitoring the frequency of priority usage in the bus interconnect 12, especially the highest priority level used by the hard real time master devices 14(0-M), valuable information can be derived as to whether more capacity needs to be allocated by the bus interconnect 12 or if excess capacity exists. Additional capacity may be provided by increasing the frequency of the bus interconnect clock signal 18 (FIG. 1) to increase performance. If excess capacity exists, the frequency of the bus interconnect clock signal 18 may be able to be lowered to conserve power. This capacity information will be sent to a power manager mechanism that can trigger a change in the frequency and/or voltage. The priority usage 147 can be monitored at the source, for example in the book keeping elements 36(0-M) or/and in the arbiters 26(0-P) that are using the priority for scheduling.

To determine the arbiter 26(0-P) effort, the frequency of usage for every priority level over a shifting window of time can be monitored. In this implementation, as illustrated in FIG. 8, a shift register 150 is provided with a number of elements representing the last defined number of accesses in the case of the arbiter 26(0-P), or the last defined number of GPs if implemented in the book keeping elements 36(0-M). Every new bus transaction in the case of the arbiters 26(0-P) will be shifted into the shift register 150 as an entry. The oldest value will be shifted out of the shift register 150 as an exit. The same operation can be done in the book keeping elements 36(0-M) based on the GP. Every priority level will have an associated counter 152, 154, 156, 158. Every time a new value is shifted in the shift register 150, the counter 152, 154, 156, 158 corresponding to that priority value is incremented. For every value that is shifted out, the corresponding counter 152, 154, 156, 158 will be decremented. This mechanism will allow the inference of the relative usage of priorities for the last given number of transactions for the arbiters 26(0-P), or given number of last GPs for the book keeping elements 36(0-M).

Figure 9:
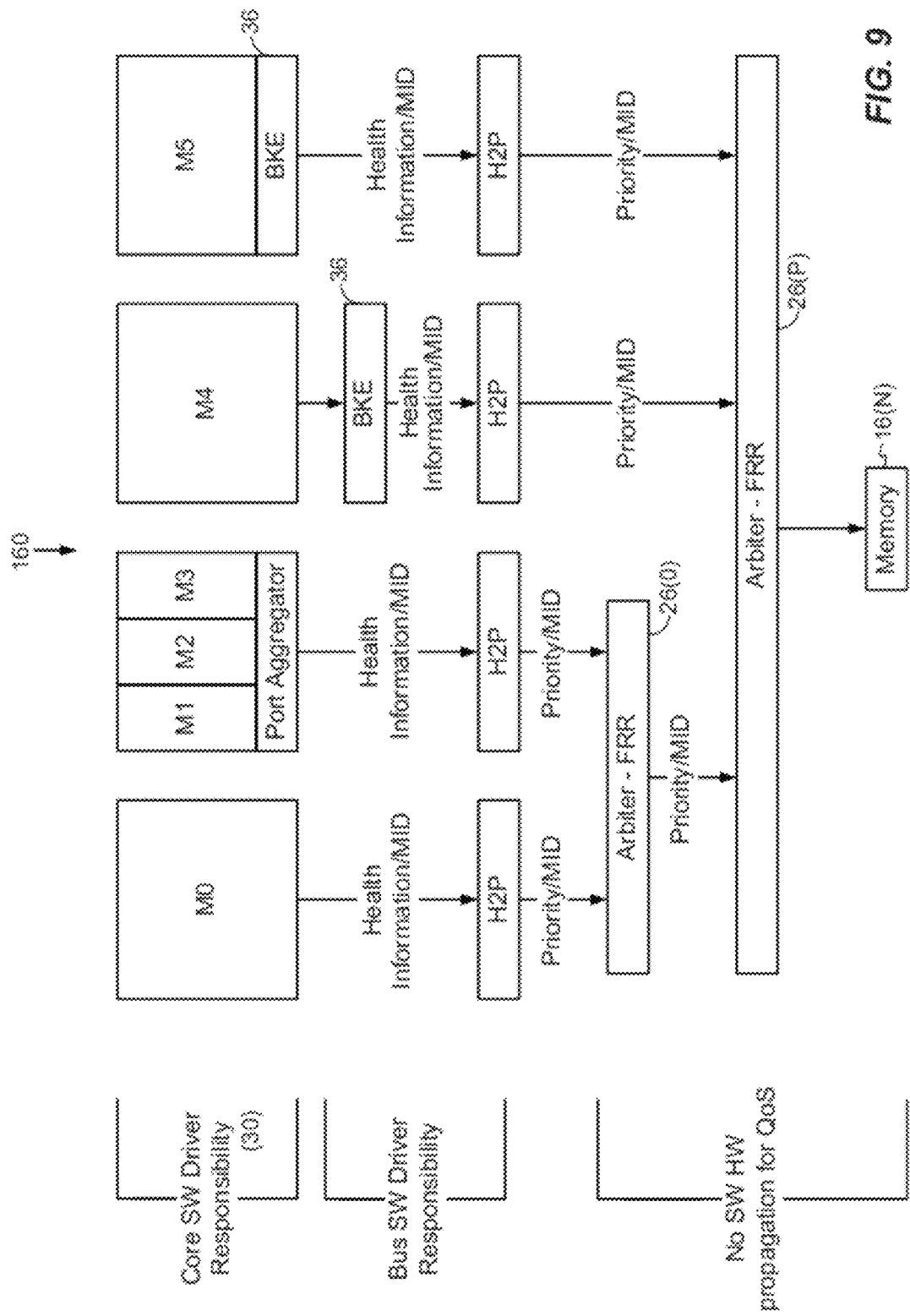
FIG. 9 is a block diagram of an exemplary software architecture for arbitrating and routing bus transactions in the bus interconnect of FIG. 1 based on health information regarding the master devices.

FIG. 9 is a block diagram of an exemplary software architecture 160 for arbitrating and routing bus transactions in the bus interconnect 12 of FIG. 1 based on health information 34(0-M) regarding the master devices 14(0-M). Common elements are labeled the same as provided in FIG. 1. H2P stands for health information to virtual priority space mapping.

The devices, systems, methods, and computer-readable mediums arbitrating bus transactions on a communications bus based on bus device health information according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 10:
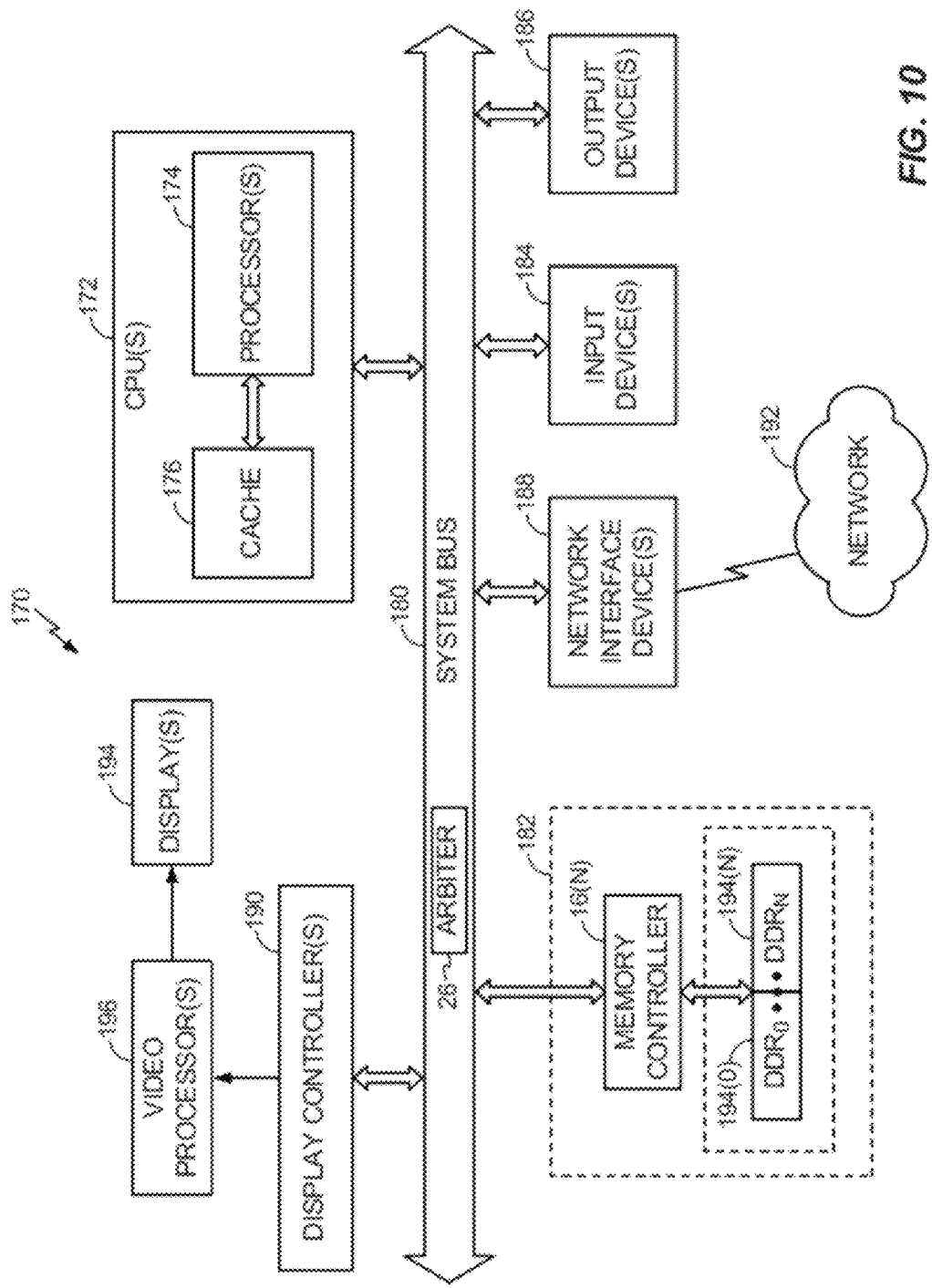
FIG. 10 is a block diagram of an exemplary processor-based system that can include the bus interconnect of FIG. 1.

In this regard, FIG. 10 illustrates an example of a processor-based system 170 that can employ components of the bus interconnect system 10 illustrated in FIG. 1. In this example, the processor-based system 170 includes one or more central processing units (CPUs) 172, each including one or more processors 174. The CPU(s) 172 may be a master device 14. The CPU(s) 172 may have cache memory 176 coupled to the processor(s) 174 for rapid access to temporarily stored data. The CPU(s) 172 is coupled to a system bus 180 and can intercouple master devices and slave devices included in the processor-based system 170. The system bus 180 may be a bus interconnect like the bus interconnect 12 illustrated in FIG. 1. As is well known, the CPU(s) 172 communicates with these other devices by exchanging address, control, and data information over the system bus 180. For example, the CPU(s) 172 can communicate bus transaction requests to the memory controller 16(N) as an example of a slave device. Although not illustrated in FIG. 10, multiple system buses 180 could be provided, wherein each system bus 180 constitutes a different fabric.

Other master and slave devices can be connected to the system bus 180. As illustrated in FIG. 10, these devices can include a memory system 182, one or more input devices 184, one or more output devices 186, one or more network interface devices 188, and one or more display controllers 190, as examples. The input device(s) 184 can include any type of input device, including but not limited to input keys, switches, voice processors, etc. The output device(s) 186 can include any type of output device, including but not limited to audio, video, other visual indicators, etc. The network interface device(s) 188 can be any devices configured to allow exchange of data to and from a network 192. The network 192 can be any type of network, including but not limited to a wired or wireless network, private or public network, a local area network (LAN), a wide local area network (WLAN), and the Internet. The network interface device(s) 188 can be configured to support any type of communication protocol desired. The memory system 182 can include one or more memory units 194(0-N). The arbiter 26 may be provided between the system bus 180 and master and slave devices coupled to the system bus 180, such as, for example, the memory units 194(0-N) provided in the memory system 182.

The CPU 172 may also be configured to access the display controller(s) 190 over the system bus 180 to control information sent to one or more displays 194. The display controller(s) 190 sends information to the display(s) 194 to be displayed via one or more video processors 196, which process the information to be displayed into a format suitable for the display(s) 194. The display(s) 194 can include any type of display, including but not limited to a cathode ray tube (CRT), a liquid crystal display (LCD), a plasma display, etc.

The CPU(s) 172 and the display controller(s) 190 may act as master devices to make memory access requests to the arbiter 26 over the system bus 180. Different threads within the CPU(s) 172 and the display controller(s) 190 may make requests to the arbiter 26. The CPU(s) 172 and the display controller(s) 190 may provide the MID to the arbiter 26, as previously described, as part of a bus transaction request.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art.

Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A bus interconnect configured to:
   determine health information for a plurality of master devices, respective ones of the plurality of master devices assigned a master device class from among a plurality of master device classes;
   map the health information for the respective ones of the plurality of master devices into a virtual priority space comprising a plurality of possible maximum priorities, based on the master device class assigned to the respective ones of the plurality of master devices;
   translate the virtual priority space into a physical priority level for the respective ones of the plurality of master devices; and arbitrate bus transactions for the plurality of master devices based on the physical priority level for the respective ones of the plurality of master devices.

2. The bus interconnect of claim 1 configured to receive the bus transactions from the plurality of master devices.

3. The bus interconnect of claim 1, further comprising at least one arbiter configured to arbitrate the bus transactions based on the physical priority level.

4. The bus interconnect of claim 1, further configured to allocate relative priorities of the plurality of master devices based on an assignment of the master device class among the plurality of master device classes to the plurality of master devices.

5. The bus interconnect of claim 1, wherein the master device class is comprised of at least one of a hard real time class, a low latency class, a soft real time class, and a best effort class.

6. The bus interconnect of claim 1 configured to receive the health information from at least one master device among the plurality of master devices.

7. The bus interconnect of claim 1, wherein the health information for at least one master device among the plurality of master devices is comprised of a plurality of health information segments corresponding to a plurality of address segments in an address map for the at least one master device.

8. The bus interconnect of claim 1 further comprising at least one book keeping element (BKE) configured to derive the health information for at least one of the plurality of master devices.

9. The bus interconnect of claim 8, wherein the at least one book keeping element is configured to derive the health information for the at least one of the plurality of master devices based on a credit/debit option.

10. The bus interconnect of claim 8, wherein the at least one book keeping element is configured to derive the health information for the at least one of the plurality of master devices based on an averaging bandwidth threshold option.

11. The bus interconnect of claim 8, wherein the at least one book keeping element is clocked independently from a bus interconnect clock signal.

12. The bus interconnect of claim 1 configured to arbitrate the bus transactions based on at least one arbitration priority policy selected from the group consisting of a round-robin arbitration priority policy, a round-robin with re-ordering arbitration priority policy, and a fixed arbitration priority policy.

13. The bus interconnect of claim 1, further comprising a priority usage monitor configured to monitor a frequency of priority usage of the plurality of master devices.

14. The bus interconnect of claim 13, wherein the priority usage monitor is configured to determine capacity requirements for arbitrating the bus transactions.

15. The bus interconnect of claim 14 configured to decrease a frequency of a bus interconnect clock signal if the capacity requirements are less than a threshold related to available capacity for arbitrating the bus transactions.

16. The bus interconnect of claim 15 wherein the threshold is ninety percent (90%) of the available capacity for arbitrating the bus transactions.

17. The bus interconnect of claim 14 configured to increase a frequency of a bus interconnect clock signal if the capacity requirements are more than a threshold related to available capacity for arbitrating the bus transactions.

18. The bus interconnect of claim 17 wherein the threshold is ninety percent (90%) of the available capacity for arbitrating the bus transactions.

19. The bus interconnect of claim 1 integrated into a semiconductor die.

20. The bus interconnect of claim 1, further comprising a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player, into which the bus interconnect is integrated.

21. A bus interconnect, comprising:
a means for determining health information for a plurality of master devices, respective ones of the plurality of master devices assigned a master device class from among a plurality of master device classes;
a means for mapping the health information for the respective ones of the plurality of master devices into a virtual priority space comprising a plurality of possible maximum priorities, based on the master device class assigned to the respective ones of the plurality of master devices;
a means for translating the virtual priority space into a physical priority level for the respective ones of the plurality of master devices; and
a means for arbitrating bus transactions for the plurality of master devices based on the physical priority level for the respective ones of the plurality of master devices.

22. A method of arbitrating bus transactions in a bus interconnect, comprising:
determining health information for a plurality of master devices, respective ones of the plurality of master devices assigned a master device class from among a plurality of master device classes;
mapping the health information for the respective ones of the plurality of master devices into a virtual priority space comprising a plurality of possible maximum priorities, based on the master device class assigned to the respective ones of the plurality of master devices;
translating the virtual priority space into a physical priority level for the respective ones of the plurality of master devices; and
arbitrating bus transactions for the plurality of master devices based on the physical priority level for the respective ones of the plurality of master devices.

23. A computer-readable medium having stored thereon computer executable instructions to cause a bus interconnect to:
determine health information for a plurality of master devices, respective ones of the plurality of master devices assigned a master device class from among a plurality of master device classes;
map the health information for the respective ones of the plurality of master devices into a virtual priority space comprising a plurality of possible maximum priorities, based on the master device class assigned to the respective ones of the plurality of master devices;
translate the virtual priority space into a physical priority level for the respective ones of the plurality of master devices; and
arbitrate bus transactions for the plurality of master devices based on the physical priority level for the respective ones of the plurality of master devices.

* * * * *